United States Patent [19]
Sekhar et al.

[11] Patent Number: 5,837,632
[45] Date of Patent: Nov. 17, 1998

[54] METHOD FOR ELIMINATING POROSITY IN MICROPYRETICALLY SYNTHESIZED PRODUCTS AND DENSIFIED

[75] Inventors: Jainagesh A. Sekhar; Naiping Zhu, both of Cincinnati, Ohio

[73] Assignee: Micropyretics Heaters International, Inc., Cincinnati, Ohio

[21] Appl. No.: 27,710

[22] Filed: Mar. 8, 1993

[51] Int. Cl.⁶ .................................................. C04B 35/58
[52] U.S. Cl. ........................ 501/96.3; 264/430; 264/431; 264/434; 501/127; 419/45
[58] Field of Search ................................ 264/27, 25, 430, 264/431, 434; 501/127, 96.3, 153; 419/45, 53, 2, 10; 148/526; 423/53; 156/89, 272.2, 274.4

[56] References Cited

U.S. PATENT DOCUMENTS

| | | | |
|---|---|---|---|
| 3,090,094 | 5/1963 | Schwartzwalder et al. | 25/156 |
| 3,097,930 | 7/1963 | Holland | 25/156 |
| 3,111,396 | 11/1963 | Ball | 25/156 |
| 3,345,440 | 10/1967 | Googin et al. | 264/29 |
| 3,705,791 | 12/1972 | Bredzs | 29/195 |
| 3,726,643 | 4/1973 | Merzhanov et al. | 423/409 |
| 3,778,249 | 12/1973 | Benjamin et al. | 25/0.5 BC |
| 3,893,917 | 7/1975 | Pryor et al. | 210/69 |
| 3,947,363 | 3/1976 | Pryor et al. | 210/510 |
| 3,962,081 | 6/1976 | Yarwood et al. | 210/69 |
| 4,024,056 | 5/1977 | Yarwood et al. | 210/69 |
| 4,081,371 | 3/1978 | Yarwood et al. | 210/69 |
| 4,217,948 | 8/1980 | Merzhanov et al. | 164/115 |
| 4,257,810 | 3/1981 | Narumiya | 106/42 |
| 4,258,099 | 3/1981 | Narumiya | 428/311 |
| 4,391,918 | 7/1983 | Brockmeyer | 501/127 |
| 4,405,433 | 9/1983 | Payne | 204/225 |
| 4,420,294 | 12/1983 | Lichtinghagen | 425/79 |
| 4,459,363 | 7/1984 | Holt | 501/96 |
| 4,697,632 | 10/1987 | Lirones | 164/369 |
| 4,699,763 | 10/1987 | Sinharoy et al. | 419/11 |
| 4,704,372 | 11/1987 | Watanabe et al. | 501/87 |
| 4,710,348 | 12/1987 | Brupbacher et al. | 420/129 |
| 4,751,048 | 6/1988 | Christodoulou et al. | 420/129 |
| 4,772,452 | 9/1988 | Brupbacher et al. | 420/129 |
| 4,774,052 | 9/1988 | Nagle et al. | 420/129 |
| 4,800,065 | 1/1989 | Christodoulou et al. | 420/129 |
| 4,808,372 | 2/1989 | Koczak et al. | 420/457 |
| 4,836,982 | 6/1989 | Brupbacher et al. | 420/129 |
| 4,900,698 | 2/1990 | Lundsager | 501/80 |
| 4,902,457 | 2/1990 | Wada et al. | 264/43 |
| 4,904,424 | 2/1990 | Johnson | 264/566 |
| 4,909,842 | 3/1990 | Dunmead et al. | 75/236 |

(List continued on next page.)

FOREIGN PATENT DOCUMENTS

| | | |
|---|---|---|
| 0126555 | 11/1984 | European Pat. Off. . |
| 192602 | 8/1986 | European Pat. Off. . |
| 0404943 | 1/1991 | European Pat. Off. . |

OTHER PUBLICATIONS

J.W. McCauley et al. "Simultaneous Preparation . . . ", Ceramic Engineering, 3 (1982), pp. 538–554.

R.W. Rice et al., "Effects of Self–Propagating . . . " Ceramic Engineering, 7 (1986), pp. 737–749.

H.C. Yi, Journal Materials Science, 25 (1990) pp. 1159–1168.

C.H. Samans "Powder Metallurgy", American Society For Metals, Metals Handbook, 1948, pp. 47–52.

*Primary Examiner*—Christopher A. Fiorilla
*Attorney, Agent, or Firm*—Dinsmore & Shohl, LLP

[57] ABSTRACT

A method for optimizing the performance characteristics of a combustion synthesized ceramic or metal ceramic product, including the steps of initially applying sufficient current to the product so as to raise the temperature of the product to a minimum of 50% of the melting point in degrees Kelvin, of the lowest melting phase in the product and thereby densifying the product. A method for enhancing the adherence of a ceramic or metal ceramic electrical heating element to an electrical terminal, and for improving the electrical properties of the resulting product is included.

11 Claims, 2 Drawing Sheets

5,837,632
Page 2

U.S. PATENT DOCUMENTS

| | | | |
|---|---|---|---|
| 4,915,903 | 4/1990 | Brupbacher et al. | 429/128 |
| 4,915,905 | 4/1990 | Kampe et al. | 420/418 |
| 4,948,676 | 8/1990 | Darracq et al. | 428/539 |
| 4,948,761 | 8/1990 | Hida | 501/89 |
| 4,957,885 | 9/1990 | Hida | 501/89 |
| 4,965,044 | 10/1990 | Miyamoto et al. | 419/12 |
| 4,975,191 | 12/1990 | Brockmeyer et al. | 210/510 |
| 4,975,412 | 12/1990 | Okazaki et al. | 264/27 |
| 4,985,202 | 1/1991 | Moshier et al. | 420/590 |
| 4,988,480 | 1/1991 | Merzhanov et al. | 419/11 |
| 4,990,295 | 2/1991 | Hida | 264/65 |
| 4,999,144 | 3/1991 | Miyamoto et al. | 264/27 |
| 5,006,290 | 4/1991 | Hida | 264/65 |
| 5,022,991 | 6/1991 | Day et al. | 210/506 |
| 5,030,600 | 7/1991 | Hida et al. | 501/98 |
| 5,032,332 | 7/1991 | Hida et al. | 214/65 |
| 5,071,797 | 12/1991 | Hida | 501/87 |
| 5,085,804 | 2/1992 | Washburn | 252/516 |
| 5,143,668 | 9/1992 | Hida | 264/63 |
| 5,145,619 | 9/1992 | Abramovici | 264/60 |
| 5,149,677 | 9/1992 | Merzhanov et al. | 501/96 |
| 5,154,785 | 10/1992 | Tabata et al. | 156/89 |
| 5,169,572 | 12/1992 | Matthews | 264/27 |
| 5,260,263 | 11/1993 | Enomoto et al. | 505/430 |

METHOD FOR ELIMINATING POROSITY IN MICROPYRETICALLY SYNTHESIZED PRODUCTS AND DENSIFIED

FIELD OF THE INVENTION

The present invention provides a novel method for the near-complete elimination of porosity in ceramic and metal-ceramic products manufactured by micropyretic synthesis. More specifically, this invention provides a novel method for the near-complete elimination of porosity in ceramic and metal-ceramic heating elements, superconducting wires and in products having negative temperature coefficients (NTC), products having positive temperature coefficients, products for structural use, products for electrical and electronic applications and products for magnetic applications. Even more specifically, this invention provides a novel method for the simultaneous (a) near-complete elimination of porosity in $MoSi_2$ heating elements and (b) creation of a non-oxidizing silica layer on the $MoSi_2$ heating elements. A second aspect of the present invention provides a novel method for the rapid sintering and homogenization of products of combustion synthesis. More specifically, this invention provides a novel method for the rapid sintering and homogenization of ceramic and metal-ceramic heating elements, superconducting wires and of products having negative temperature coefficients (NTC), products having positive temperature coefficients, products for structural use, products for electrical and electronic applications and products for magnetic applications. A third aspect of the present invention provides a novel method for enhancing the adherence of a ceramic or metal ceramic electrical heating element to an electrical terminal, and for improving the electrical properties of the resulting product.

BACKGROUND OF THE INVENTION

Micropyretic synthesis, also referred to as combustion synthesis or self-propagating high-temperature synthesis (the term Micropyretic Synthesis is preferred for slurries), is a novel processing method for the production of intermetallics, engineering ceramics, metal-ceramics, and other materials. See U.S. Pat. No. 5,188,678 hereinafter referred to as the '678 patent. The technique employs exothermic reaction processing which circumvents difficulties associated with conventional methods of time and energy-intensive sinter processing. Complicated engineering gear shapes, such as shown in the '678 patent, have been successfully produced by this technique.

Two basic micropyretic synthesis modes are commonly employed, namely the wave propagation mode and the thermal explosion mode. In the wave propagation mode, the combustible compact is ignited at a point by a heat source. After ignition, the heat required to propagate the combustion wave is obtained from the heat released by the formation of the synthesized product. The unreacted portion in front of the combustion wave is heated by this exothermic heat, undergoes synthesis, the wave propagates, thus causing further reaction and synthesis. In the thermal explosion mode, the specimen is heated in a furnace. The furnace may be kept at the ignition temperature or the specimen may be heated in the furnace at a predetermined heating rate to the ignition temperature. The combustion reaction in this mode may occur more or less simultaneously at all points in the specimen. Although the combustion product phases obtained by both techniques are similar, there may be differences in the amount of residual porosity and the final dimensions of the synthesized part.

The advantages of micropyretic synthesis techniques include rapid net shape processing as disclosed in the '678 patent and clean products. When compared with conventional powder metallurgy operations, micropyretic synthesis not only offers shorter processing time, but also eliminates the need for high-temperature sintering. Volatile impurities or contaminants are expected to be expelled as the high temperature combustion wave propagates through the sample, and thus the synthesized products have high purity.

In most combustion synthesized products, porosity of the final product is often the most uncontrollable and deleterious drawback. It has been shown that porosity degrades mechanical properties in combustion synthesized parts. See, H. P. Li, S. Bhaduri and J. A. Sekhar, Metal Trans A 1992, vol. 23 p 251–261. Porosity increases with the proportion of the material which is combustible as this raises the combustion temperature. Porosity mainly develops from (a) the molar volume differences between reactants and products; (b) the porosity from the initial powder or slurry compact (See the '678 patent and co-pending U.S. patent application Ser. No. 07/537902 now abandoned); (c) gases adsorbed and absorbed in the initial reactants; and (d) the expansion, swelling and related pressure of gases in the initial compact.

The techniques for elimination of porosity from products of combustion synthesis have included the following: (1) the simultaneous synthesis and sintering of the product; (2) the application of external force or pressure during or soon after combustion. See e.g.: U.S. Pat. No. 4,909,842 and J. Puszynski, S. Majorowski and V. Hlavacek, Ceram Engn. Sci. Proc.,Vol. 11, p.1182,1990.; (3) the use of liquid phases in the combustion process to promote the formation of dense products. See e.g.: Z. A. Munir and U. Anselmi-Tamburini, Mater. Sci. Reports, vol.3, p. 277, 1989; J. B Holt, S. D. Dunmead, Annual rev of Mater Sci. vol. 21 pg 305, 1991; Z. A. Munir, Amer Ceram Bull, Vol 67(2), pg. 342, 1988; H. C. Yi and J. J. Moore, J. Mater Sci., vol. 25, p 1159, 1992; J. Subramanyam and M. Vijaykumar, J. Mater. Sci. vol 27. pg. 6249, 1992; and U.S. Pat. No. 4,961,778 and U.S. Pat. No. 4,610,726 (not directed towards combustion synthesized samples but incorporating liquid phase for densification); and (4) lessening the gas evolution by outgassing the reactant compact prior to ignition.

All the techniques mentioned above have serious drawbacks. Combustion processes are rapid by nature and the time for simultaneous sintering is always too short to be of value.

External force or pressure is difficult to apply in most situations involving combustion, a point made in detail in the '678 patent. Additionally, such application of pressure (normally as high as 0.3 GPa) limits this method to use with simple shapes like cylinders and to situations where die damage is not a problem. Die damage invariably occurs when pressure is applied at the high temperatures usually associated with combustion synthesis. In fact to overcome the problems and high cost associated with die damage, several variations of the pressure techniques have been developed. These include (a) hot pressing immediately after the combustion wave; (b) hot rolling behind the combustion wave; (c) high pressure during combustion; and (d) shock wave consolidation with explosives or by dynamic compaction. See Z. A. Munir and U. Anselmi-Tamburini, Mater. Sci. Reports, vol. 3, p 277, 1989; J. B Holt, S. D. Dunmead, Annual rev of Mater Sci. vol. 21 p 305, 1991; and Z. A. Munir, Amer Ceram Bull, Vol 67(2), p 342, 1988; H. C. Yi and J. J. Moore, J. Mater Sci., vol. 25, p 1159, 1992; J. Subramanyam and M. Vijaykumar, J. Mater. Sci. vol 27. p 6249, 1992; S. D. Dunmead, Z. A. Munir, J. B. Holt and D.

D. Kingman, Combustion and Plasma Synthesis of High Temperature Materials, Z. A. Munir and J. B. Holt eds., VCH publishers, NY, p 229, 1990; J. B. Holt, Mater Research Bull., Vol 12(7), p 60, 1990; and L. J. Kecskes, T. Kohke and A. Niler, J. Amer Ceram. Soc., vol. 73, p 1274, 1990; L. J. Kecskes, R. F. Benk and P. H. Netherwood Jr., J. Amer Ceram Soc., Vol.73, p 383, 1990. Notably, however, none of the techniques developed to avoid die damage have eliminated this problem.

If a liquid phase is involved then it is hoped that this liquid phase will wet the products and will fill the porosity which is formed during the combustion, thereby leading to the formation of denser products. Unfortunately this technique has several drawbacks including the fact that most often the liquid does not wet the products. The volume of the liquid may not be enough to fill the pores and the residence time of the hot liquid again may be too short to fill the pores in time. To improve such drawbacks simultaneous liquid formation and pressure application has been tried by centrifuging the part, but with limited success. See e.g. P. Odowara, J. Amer Ceram. Soc. Vol. 73(3), p 629, 1990. In any case, 130 G's (a 'G' is the unit for acceleration due to gravity ~9.81 $MN/M^2$), had to be applied for making the liquid enter the pores. Such a high applied acceleration limits the size of the part that may be densified and additionally limits the kind of material which may be densified. These problems are distinct from the complexity that would be required for an experimental system which would be capable of applying such accelerations at the high temperatures at which combustion synthesis typically occurs.

The simplest method to eliminate the porosity would really have been a high temperature sintering of the combustion synthesized part in a suitable furnace. If at all possible, the application of this technique is limited in situations where densification has to occur at temperatures well above 1500° C., because of the limited availability and the small sizes of furnaces at such high temperatures. Although the furnace sintering method is simple, there are other drawbacks to such an operation, aside from the high costs normally associated with furnace sintering. The real disadvantage of such a technique lies in the fact that the agglomerated porosity (such as always obtained in combustion synthesis) cannot be eliminated in this manner to obtain full density. See e.g. B. Kellet and F. Lange J. Ceram. Soc. vol 72, pg 725, 1989. Additionally, non-homogeneity will not be eliminated but in fact will be accentuated by such furnace treatment. Most often combustion synthesis by its very nature occurs by propagation of combustion fronts which are spatially marginally unstable. Only in very rare cases such as when TiC is synthesized, is the front completely stable. The instabilities are minor and may not always be apparent to the naked eye, but they do exist. The final part moreover possesses minute bands or other types of non-homogeneities which make electrical and magnetic properties non-uniform. After furnace sintering such non-homogeneities will persist and even amplify into several zones with gross discontinuities.

Outgassing merely holds porosity constant. No actual densification of compact occurs, except to accommodate change in molar density from slurry phase to product phase. Thus outgassing only avoids large pores.

When dealing with parts which look like wires or thin plates (copending patent application Ser. No. 07/847,782 now abandoned and co-pending application Ser. No. 08/197, 166 now abandoned entitled METHOD FOR JOINING CERAMIC AND METAL-CERAMIC HEATING ELEMENTS TO ELECTRICAL TERMINALS BY MICROPYRETIC SYNTHESIS, COMPOSITIONS FOR ELECTRICAL TERMINALS AND HEATERS COMPRISING THE SAME, Zhu and Sekhar) and which are made from pliable pasty reactants, is impossible to apply pressure or centrifuge without seriously damaging the part in question. In addition, in cases where little or no liquid is created during combustion, the liquid filling technique is impossible to invoke.

The present invention relates to a unique method for the densification of products of combustion synthesis which will eliminate the above noted problems associated with the state of the art regarding elimination of porosity in combustion synthesized products. The method utilizes the special properties of combustion synthesized materials namely their electrical conductivity and electrical "connectivity" (the speed of the micropyretic synthesis reaction allows no insulating interfaces to develop in the material; the lesser the insulating interfaces, greater the "connectivity") of different phases obtained because of the high temperatures and clean internal interfaces resulting from combustion synthesis. In its second aspect the present invention provides a method for the rapid sintering and concomitant homogenization of products of combustion synthesis, by virtue of which the combustion synthesized materials may be safely and effectively used as heating elements and in other devices requiring homogeneous microstructure and properties. The present invention also provides combustion synthesized products manufactured using the above methods and having the advantageous properties described above.

SUMMARY OF THE INVENTION

It is a primary object of the present invention to provide a method for the densification of products of combustion synthesis by the near-elimination of porosity, which method overcomes the various problems associated with state of the art methods used for the same purpose.

It is another object of the present invention to provide a method for the rapid sintering and concomitant homogenization of products of combustion synthesis, by virtue of which the combustion synthesized materials may be safely and effectively used as heating elements and in other devices requiring homogeneous microstructure and properties.

It is a further object of the present invention to provide a low cost technique for densifying and sinter-homogenizing micropyretic synthesized or combustion synthesized articles.

It is yet another object of the present invention to provide a method for the production of micropyretic synthesized or combustion synthesized articles which have a greatly reduced incidence of hot spots during their service life.

A still further object of the present invention is to provide a method for the manufacture of micropyretic synthesized or combustion synthesized articles which are highly ductile and formable during the passage of current and the obtaining of high temperatures.

Yet another object of the present invention is to provide a unique method of densifying articles at temperatures that are greater than a minimum of 50% of the melting point in degrees Kelvin, of the lowest melting phase in the article, as furnaces which operate above these temperatures are severely limited in size and atmospheres.

It is also an object of the present invention to provide a method for the simultaneous densification and creation of oxidation prevention silica layers on molybdenum disilicide heating elements made by the combustion synthesis.

It is a further object of the present invention to provide a method for the sintering of products of combustion synthesis wherein the article shape and size for compaction is not limited, and can be easily changed according to the practical application, as sintering space for the article is not limited by the sintering furnace space.

Yet another object of the present invention is to provide a method for the complete combustion of any uncombusted regions left in the sample after initial combustion.

It is also an object of the present invention to provide combustion synthesis products having the advantageous properties described above.

It is also an object of the present invention to provide a method for enhancing the adherence of a ceramic or metal ceramic electrical heating element to a ceramic, metal-ceramic or metallic terminal, and for improving the electrical properties of the resulting attachment.

In accordance with the present invention, there is provided a method for optimizing the performance characteristics of a combustion synthesized ceramic or metal ceramic product, the product having been manufactured by blending a mixture comprising between about 5% and 95% by weight of at least one reactive system, wherein said reactive system comprises at least two particulate combustible materials which will react exothermically with one another by combustion synthesis and are present in such proportion to one another that combustion will occur when ignited, upto 95% by weight of a filler material, and optionally a sufficient amount of a liquid phase in order to form a slurry, fashioning said mixture into a desired and uncombusted shape, and combusting said shape by ignition at a temperature between about 150° C. and 1800° C.; the method comprising the steps of: initially applying sufficient current to the product so as to raise the temperature of the product to a minimum of 50% of the melting point in degrees Kelvin, of the lowest melting phase in the product, wherein the current applied is selected from the group consisting of a DC current, an AC current, a pulsed current and an induction current; and greatly reducing the porosity of said product so as to make the repetitive distance between consecutive homogenous sections of said product to less than 0.002 m, by increasing said current applied so as to cause the elimination of thermal and mass gradients.

In accordance with another aspect of the present invention, there is provided a method for optimizing the performance charachteristics of a $MoSi_2$ combustion synthesis product, the product having been manufactured by blending a mixture comprising between about 10% and 70% by weight of a mixture of $MoO_3$, Al and Si, 30% to 85% by weight of a filler, and 1% to 10% of bentonite plasticize to form a slurry, fashioning said slurry into a desired wet and uncombusted shape, drying said wet shape, combusting the dried shape by ignition at a temperature between about 150° C. and 1800° C., the method comprising the steps of: initially applying sufficient current to the product so as to raise the temperature of the product to a minimum of 50% of the melting point in degrees Kelvin, of the lowest melting phase in the product, wherein the current applied is selected from the group consisting of a DC current, an AC current, a pulsed current and an induction current; and greatly reducing the porosity of said product so as to make the repetitive distance between consecutive homogenous sections of said product to less than 0.002 m, by increasing said current so as to cause the elimination of thermal and mass gradients.

In accordance with a further aspect of the present invention, there is provided a method for enhancing the adherence of a ceramic or metal ceramic electrical heating element to an electrical terminal, and for improving the electrical properties of the resulting attachment, the element having been joined to the terminal by a method including the steps of preparing the electrical terminals by blending a mixture comprising between about 5% and 95% by weight of at least one reactive system, wherein said reactive system comprises at least two particulate combustible materials which will react exothermically with one another by micro-pyretic synthesis and are present in such proportion to one another that combustion will occur when ignited, upto 95% by weight of a filler material, and optionally a sufficient amount of a liquid phase in order to form a slurry, fashioning said mixture into a desired uncombusted shape for said terminal, placing said heating element into close contact with said uncombusted terminal so as to attach said terminal to said element and combusting the terminal portion of said terminal-element attachment by ignition at a temperature between about 150° C. and 1800° C.; the method for enhancing the adherence and for improving the electrical properties comprising the steps of: initially applying sufficient current to said attachment so as to raise the temperature of said attachment to a minimum of 50% of the melting point in degrees Kelvin, of the lowest melting phase in the product, wherein the current applied is selected from the group consisting of a DC current, an AC current, a pulsed current and an induction current; and greatly reducing the porosity of said attachment so as to make the repetitive distance between consecutive homogenous sections of said product to less than 0.002 m, by increasing said current applied so as to cause the elimination of thermal and mass gradients.

DETAILED DESCRIPTION OF THE PREFERRED EMBODIMENT

In accordance with the preferred embodiment of the present invention, the initial composition of the combustion synthesis product includes combustible materials, filler materials including conductive phases, sintering agents and plasticizers. The combustible components provide enough heat to sinter the sample and weld the conductive phases during the combustion reaction. According to the present invention, the combustible sources could be, for e.g. the mixture of $MoO_3+2Al+2Si$; $3Ni+Al$; $Ti+2B$; $Y_2O_3+BaO+Cu+O_2$, etc.

The combustible materials can be pre-mixed before mixing with filler and plasticizer materials and also can be mixed with filler and plasticizer at same time.

In the case of the $MoO_3+2Al+2Si$ system, the combustible content can be 10–50 wt %, or more preferably 12–30 wt %. More than 40% combustible content will generate too much heat and may lead to cracks and distorted shape. Sample with less than 12% combustion source will show weak combustion and weak strength and may not effectively join all the electrically conductive phase prior to the treatment with the electric currents. Filler materials could contain conductive phases, sintering agents and other active or inactive materials. In the case of Molybdenum-di-Silicide heating elements and terminals, $MoSi_2$ may be used as a main filler material and its content can be 50–85 wt %. A high content of $MoSi_2$ phase will increase the conductivity after combustion. Other filler materials could include one or more combinations of $Y_2O_3$, SiC, Colloidal $SiO_2$, $HfO_2$, $TiB_2$, Colloidal alumina, $Si_3N_3$, $CeO_2$, Si, Al, B etc. These filler materials will act as sintering agents or inert filler and will enhance sintering process during passage of the current to the article, and will also reduce the incidence of combustion cracks. The plasticizer used in this invention could be bentonite, the content for $MoSi_2$-based heating element manufacture being 1–10 wt %, more preferred, 3–6 wt %.

As will be evident from the compositions set forth hereinafter, the best known mode of carrying out the invention includes the use of the following procedures, all percentages being by weight.

Procedure 1

Step 1. The combustible powder is weighed according to the desired composition (see compositions given below and compositions from co-pending application entitled METHOD FOR JOINING CERAMIC AND METAL-CERAMIC HEATING ELEMENTS TO ELECTRICAL TERMINALS BY MICROPYRETIC SYNTHESIS, COMPOSITIONS FOR ELECTRICAL TERMINALS AND HEATERS COMPRISING THE SAME, Zhu and Sekhar).

Step.2. The combustible powders are mixed in a plastic vial with methacrylate mixing balls as mixing media for 10 mins.

Step 3. The mixed combustible powder and other powders (filler and plasticizer powder) are weighed according to the desired composition.

Step 4. The weighed powders are mixed in a plastic vial with methacrylate balls as mixing media for 30 mins.

Step 5. For composition A below, colloidal silica solution (Nyacol 830, The PQ Corporation) is added according to the composition. For other compositions, distilled water is introduced.

Step 6. The powder and liquid are mixed by pestles for 15–30 mins. The water content should be adjusted to form a plastic mass which is suitable to extrude.

Step 7. The plastic mass is put into a die, and the slurry degassed with a vacuum pump. Then the degassed plastic mass is forced through a die to produce wire.

Step 8. The green wire is formed into various shapes such as U-shape or straight wire.

Step 9. The wires from step 7 are dried in air for 24 hrs.

Step 10. The wires are combusted by propane fuel torch or any other appropriate technique including laser, electron beam, concentrated sunlight, or passage of current, if the compact is conductive.

Step 11. The terminals of combusted wire are polished with abrasive paper and cleaned with alcohol and wrapped with metallic(aluminum) foil.

Step 12. Variable AC transformer or power supply is now connected to the foil and the current is used to heat the sample to a temperature between 1500°–1600° C. (monitored with an optical pyrometer) for 15–30 mins. During this period, the sample is being densified. The current is preferably adjusted to be low initially and then gradually increased. It is noticed that initially only some sections of the wire become red indicating that the sample is non-homogeneous. Then as the current is increased the red zone is seen to spread and the sample becomes uniformly the same color indicating that the technique causes homogenization. (For composition A, starting with a 1 mm wire, it was noticed that initially 7 amps of current caused non-uniform red spots. On slowly increasing the current to 10 amps the red spots disappeared and the sample appeared uniform at 1550° C.).

Step 13. For the $MoSi_2$ wires made in this fashion it was noted that the wires which were extremely brittle at room temperature became highly ductile at these high temperatures. Thus, these articles can be further shaped, if so desired.

In some instances, a DC power supply was used for cost saving purposes. For obtaining high currents a pulsed power supply was sometimes used. In other variations, the sample was simultaneously combusted and densified with the passage of the electric current. In yet another variation the sample was heated externally with an oxyacetylene flame while current was introduced.

Procedure 2

Step 1. The combustible powders are weighed according to the desired composition.

Step.2. The combustible powders are mixed with methacrylate balls as mixing media for 10 mins.

Step 3. The mixed combustible powder and other powders (filler and plasticizer powder) are weighed according to the desired composition.

Step 4. The weighed powders are further mixed with methacrylate balls as mixing media for 30 mins.

Step 5. For composition A, colloidal silica solution (Nyacol 830, The PQ Corporation) is added according to the desired composition in a mortar. For other compositions, distilled water is introduced.

Step 6. The powder and liquid is mixed by pestles for 15–30 mins. The water content should be adjusted to form a plastic mass which is suitable to extrude.

Step 7. The plastic mass is put into a die, and the slurry degassed by vacuum pump. Then the degassed plastic mass is forced through a die to produce wire .

Step 8. The green wire is formed into various shapes such as U-shape or straight wire.

Step 9. The articles from step 8 are dried in air overnight.

Step 10. The wires are combusted by propane fuel torch.

Step 11. Induction powder supply was used to heat the sample to a temperature of 1500°–1700° C. for 15–30 mins. The induction power supply was 50 KW, 450 MHz. Sample wire diameters could be up to 10 mm prior to densification. The current was induced in the sample article by passing the article through appropriately shaped single or multi-turn induction coils with the induction supply tuned to maximize current output. The sample became uniform and dense during the passage of induced currents through the sample.

Preferred compositions when the end product is a Molybdenum di Silicide Heating Element:

| Composition A: | |
|---|---|
| Combustible: | |
| $MoO_3$ | 17.1 (g) |
| Al | 6.3 (g) |
| Si | 6.6 (g) |
| Filler: | |
| $MoSi_2$ | 62 (g) |
| SiC | 1 (g) |
| $Si_3N_4$ | 1 (g) |
| Plasticizer: | |
| Bentonite | 6 (g) |
| Colloidal Silica | 60 ml |

-continued

Composition B:

Combustible:

| | |
|---|---|
| $MoO_3$ | 8.55 (g) |
| Al | 3.15 (g) |
| Si | 3.3 (g) |

Filler:

| | |
|---|---|
| $MoSi_2$ | 80 (g) |
| $Y_2O_3$ | 2 (g) |
| Plasticizer: Bentonite | 3 (g) |

Composition C:

Combustible:

| | |
|---|---|
| $MoO_3$ | 8.55 (g) |
| Al | 3.15 (g) |
| Si | 3.3 (g) |

Filler:

| | |
|---|---|
| $MoSi_2$ | 80 (g) |
| $HfO_2$ | 2 (g) |
| Plasticizer: Bentonite | 3 (g) |

Composition D:

Combustible:

| | |
|---|---|
| $MoO_3$ | 8.55 (g) |
| Al | 3.15 (g) |
| Si | 3.3 (g) |

Filler:

| | |
|---|---|
| $MoSi_2$ | 80 (g) |
| $TiB_2$ | 2 (g) |
| Plasticizer: Bentonite | 3 (g) |

EXAMPLE 1

Composition A and Process 1 with AC heating in step 12, was used to manufacture $MoSi_2$ heating elements. The as combusted sample was about 65% dense and weak. The density and strength were substantially increased by heating the article to a temperature between 1500°–1600° C. The as combusted sample showed nonuniform resistivity in different sections of the sample (because of the difficulty in controlling the combustion temperature uniformly). The high resistance section of the wire initially generated more heat and lead to a higher temperature and faster sintering than the low resistance section. After a certain period of time, generally about 1 min, uniform resistance was obtained throughout the wire indicating that the entire article had densified. The densification was apparent during the processing as the wire visibly thinned. After cool down the wire which was 1 mm prior to passage of the current was now 0.72 mm in diameter.

The densification process apparently has three stages in terms of the density change during the passage of the current. The first stage show fast densification as the resistivity decreases and the strength improves. The second stage shows slower densification with the resistivity decreasing slowly. The resistivity, density and strength reach a steady state in the final stage. The porosity of article after densification is less than 2%. In our test of the article (heating element made according to example 1) at 1400° C. for 4000 hrs, the sample performed well with no loss or gain in resistivity during the test. On the other hand the as-combusted samples used directly as heating elements without the densification step disclosed in this application (such as heating elements made according to co-pending U.S. patent application Ser. No. 07/847,782 or copending U.S. patent application entitled METHOD FOR JOINING CERAMIC AND METAL-CERAMIC HEATING ELEMENTS TO ELECTRICAL TERMINALS BY MICROPYRETIC SYNTHESIS, COMPOSITIONS FOR ELECTRICAL TERMINALS AND HEATERS COMPRISING THE SAME, Zhu and Sekhar) showed hot spots after 200 hours, the resistivity was no longer uniform in a similar test and the sample became very weak. This indicated that the porosity was detrimental for the overall life. The sample without the densification step was noted to be weak and brittle when compared to the densified sample.

Thus, the economic advantages of using current to obtain such high temperatures directly in the sample are obvious. In addition without the densification step, which also gave rise to the adherent silica surface on the element, the sample is subjected to oxidation and pest effect ($MoSi_2$ if heated in the range from 400°–600° C., rapidly oxidizes to $MoO_3$ and disintegrates) prior to the formation of a dense silica layer during use.

EXAMPLE 2

Composition D and Process 1 with direct current heating in step 12 was used to manufacture a $MoSi_2$ heating element. Once again the as combusted sample was only 65% dense and weak. The density and strength significantly improved by passing the current to heat the article to about 1550°–1700° C. The porosity of the heating element is less than 5%. Such a heating element can be used upto 1700° C.

Although this invention has been described so far in manufacturing $MoSi_2$ heating elements, it is not so limited. Examples 3 and 4 demonstrate the same.

EXAMPLE 3

High temperature superconductor wire manufacturing: $Y_2O_3$, BaO and Cu/CuO were weighed and mixed according to Process 1 to obtain a compound with the formula $YBa_2Cu_3O_x$. Polyvinyl Butyral was used as a plasticizer. The wire was then extruded. After drying, the high temperature superconductor (high $T_c$) wire was combusted, and was heated to 1000°–1050° C. by step 12 with direct DC heating to make a dense wire. The density of the wire after step 12 was 99%.

EXAMPLE 4

A new class of materials and a hitherto undisclosed combustion reaction was used with the densification process to make plates of high resistance materials. 30% $MoSi_2$+ 70% (0.94 $SnO_2$+0.05 $Sb_2O_3$+0.01 CuO) was made into a slurry by the addition of water. $Al_2O_3$ may be added optionally as a diluent. After extruding into a flat shape the flat pieces were dried for 24 hrs. These were then combusted using a torch. The as combusted product was clearly porous. The product of the reaction contained a new phase not indexed or identified previously, After combustion, 100 amps of current was passed through the sample to densify it to 99.9% dense at 1000°–1500° C. This material displayed NTC properties (Negative temperature coefficient). Material with such properties are extensively used in the electronic industry. Without the densification step the material was non-homogeneous, brittle and unstable.

EXAMPLE 5

Electrical terminals were made, joined and densified in per Example 1, except that the terminal diameter was normally kept at 3 times the heating element diameter.

Figure 1:
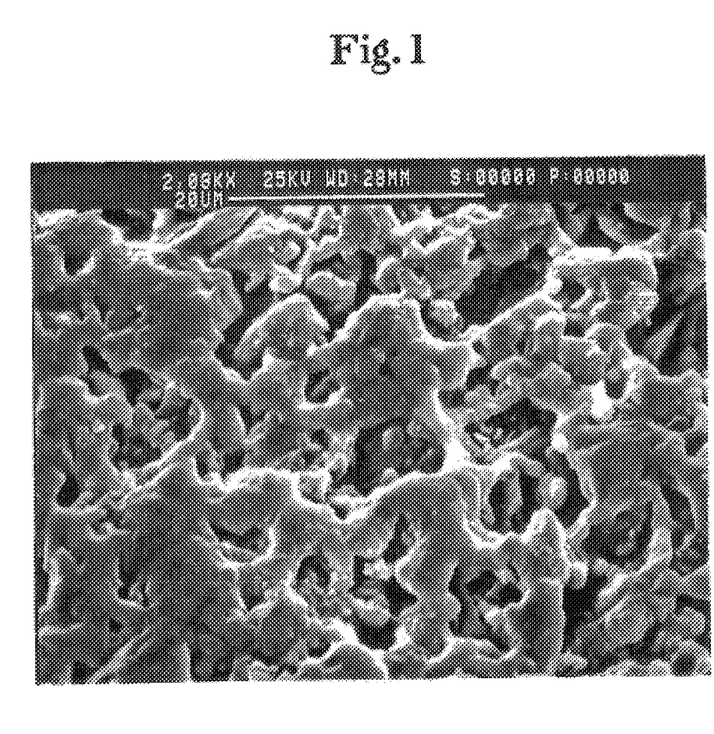
FIG. 1 shows a Scanning Electron Micrograph (SEM) of an undensified wire.
Figure 2:
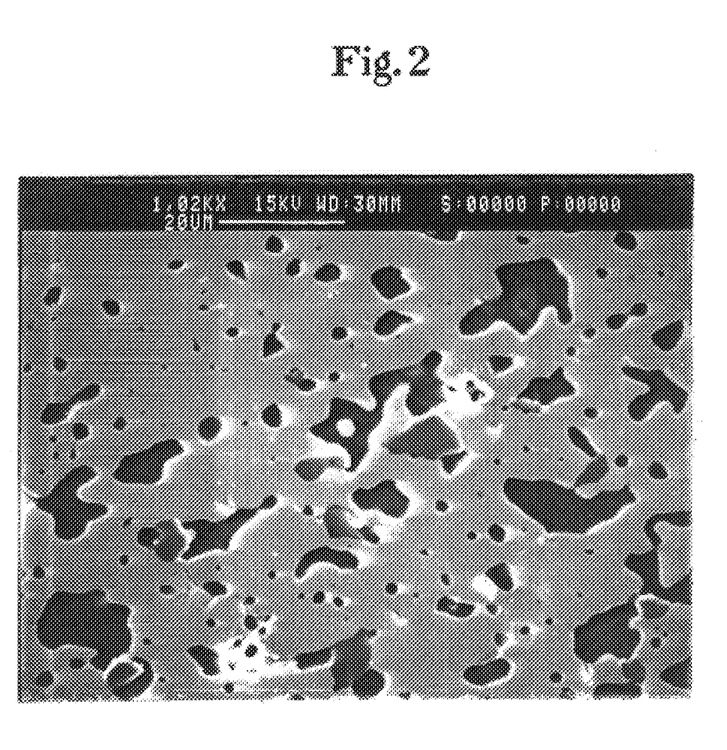
FIG. 2 shows a SEM of a densified wire manufactured in accordance with the present invention.

The dramatic effects of the method of the present invention are vividly illustrated in FIGS. 1 and 2. FIG. 1 is a SEM of an undensified wire having a porosity of 40–50%. Extensive pores are seen in FIG. 1. The pores appear to be black in the SEM, as does the alumina phase. The white $MoSi_2$ phase is not clearly demarcated from the alumina phase because of the presence of high porosity.

FIG. 2 is a SEM of a wire manufactured according to the method of the present invention. The porosity is zero. The white $MoSi_2$ phase is clearly demarcated from the black alumina phase.

The inhomogeneity in a particular combustion synthesized product can be seen best by measuring the distance between the hot spots when the combustion synthesized product is heated. When heated to a high enough temperature, the product gets red hot in homogenous sections and remains cooler in non-homogenous sections.

As per another embodiment of the present invention, there is provided a method for enhancing the adherence of a ceramic or metal ceramic electrical heating element to a ceramic, metal-ceramic or metallic terminal, and for improving the electrical properties of the resulting attachment. The specification of copending application entitled METHOD FOR JOINING CERAMIC AND METAL-CERAMIC HEATING ELEMENTS TO ELECTRICAL TERMINALS BY MICROPYRETIC SYNTHESIS, COMPOSITIONS FOR ELECTRICAL TERMINALS AND HEATERS COMPRISING THE SAME, Zhu and Sekhar, is incorporated herein by reeference. The procedures, compositions and examples described above are equally applicable to the practice of this embodiment.

We claim:

1. A method for optimizing performance characteristics of a combustion synthesized ceramic or metal ceramic product, the product having thermal and mass gradients, a lowest melting phase having a melting point and said product having homogenous sections separated by non-homogenous sections, each said homogenous section being separated from the next homogenous section by an average repetitive distance, the product having been manufactured by blending a mixture comprising between about 5% and 95% by total weight of the mixture, of at least one reactive system, wherein said reactive system comprises at least two particulate combustible materials which will react exothermically with one another by combustion synthesis and are present in such proportion to one another that combustion of said mixture will occur when ignited, up to 95% by total weight of the mixture, of a filler material, and optionally a sufficient amount of a liquid phase in order to form a slurry, fashioning said mixture into a desired and uncombusted shape, and combusting said shape by ignition at a temperature between about 150° C. and 1800° C.; the method comprising the steps of:

initially applying sufficient current to the product so as to heat the product to a minimum of 50% of the melting point in degrees Kelvin, of the lowest melting phase in the product, wherein the current applied is selected from the group consisting of a DC current, an AC current, a pulsed current and an induction current; and greatly reducing porosity of said product so as to make the repetitive distance between consecutive homogenous sections of said product to less than 0.002 m, by increasing said current applied so as to cause elimination of said thermal and mass gradients.

2. The method of claim 1 wherein the product is selected from the group consisting of heating elements, electrical terminals, products having negative temperature coefficients, products having positive temperature coefficients, products for structural use, products for electrical and electronic applications and products for magnetic applications.

3. The method of claim 2 further including the step of homogenizing the product by further applying current to the product.

4. A method for optimizing performance characteristics of a $MoSi_2$ combustion synthesis product, the product having thermal and mass gradients, a lowest melting phase having a melting point and said product having homogenous sections separated by non-homogenous sections, each said homogenous section being separated from the next homogenous section by an average repetitive distance, the product having been manufactured by blending a first mixture comprising between about 10% and 70% by total weight of said first mixture, of a mixture of $MoO_3$, Al and Si, 30% to 85% by total weight of said first mixture, of a filler, and 1% to 10% by total weight of said first mixture, of bentonite plasticizer, forming a slurry from said first mixture, fashioning said slurry into a desired wet and uncombusted shape, drying said wet shape, combusting the dried shape by ignition at a temperature between about 150° C. and 1800° C., the method comprising the steps of:

initially applying sufficient current to the product so as to heat the product to a minimum of 50% of the melting point in degrees Kelvin, of the lowest melting phase in the product, wherein the current applied is selected from the group consisting of a DC current, an AC current, a pulsed current and an induction current; and greatly reducing porosity of said product so as to make the repetitive distance between consecutive homogenous sections of said product less than 0.002 m, by increasing said current so as to cause elimination of said thermal and mass gradients.

5. The method of claim 4 wherein the product is selected from the group consisting of heating elements, electrical terminals, and products having negative temperature coefficients, products having positive temperature coefficients, products for structural use, products for electrical and electronic applications and products for magnetic applications.

6. The method of claim 5, further including the steps of:

homogenizing the product by further applying current to the product; and forming a non-oxidizing silica layer on the product.

7. A method for enhancing the adherence of an attachment of a ceramic or metal ceramic electrical heating element to a ceramic, metal-ceramic or metallic terminal, and for improving electrical properties of the attachment, the attachment having thermal and mass gradients, a lowest melting phase having a melting point and said product having homogenous sections separated by non-homogenous sections, each said homogenous section being separated from the next homogenous section by an average repetitive distance, the element having been joined to the terminal by a method including the steps of preparing the electrical terminals by blending a mixture comprising between about 5% and 95% by total weight of said mixture, of at least one reactive system, wherein said reactive system comprises at least two particulate combustible materials which will react exothermically with one another by micropyretic synthesis and are present in such proportion to one another that combustion will occur when ignited, up to 95% by total weight of said mixture, of a filler material, and a sufficient amount of a liquid phase in order to form a slurry, fashioning said slurry into a desired uncombusted shape for said terminal, pressing said heating element against said uncombusted terminal so as to enable the attachment of said terminal to said element and combusting the terminal portion of said attachment by ignition at a temperature between about 150° C. and 1800° C.; the method for enhancing the adherence and for improving electrical properties comprising the steps of:

initially applying sufficient current to said attachment so as to heat said attachment to a minimum of 50% of the melting point in degrees Kelvin, of the lowest melting phase in the product, wherein the current applied is selected from the group consisting of a DC current, an AC current, a pulsed current and an induction current; and greatly reducing porosity of said attachment so as to make the repetitive distance between consecutive homogenous sections of said product to less than 0.002 m, by increasing said current applied so as to cause elimination of said thermal and mass gradients.

8. The method of claim 7 further including homogenizing the attachment by further applying current to the attachment.

9. The method of claim 7 further comprising:

homogenizing the attachment by further applying current to the attachment; and forming a non-oxidizing silica layer on the attachment.

10. An attachment manufactured using the method of claim 9, the reactive system comprising between about 10% and 70% by total weight of said reactive system, of a mixture of $MoO_3$, Al and Si, 30% to 85% by total weight of said reactive system, of a filler, and 1% to 10% by total weight of said reactive system, of bentonite plasticizer to form a slurry.

11. The attachment of claim 10 having a porosity of less than 15%.

* * * * *